US006235817B1

(12) United States Patent
Haveaux et al.

(10) Patent No.: US 6,235,817 B1
(45) Date of Patent: *May 22, 2001

(54) BITUMINOUS COMPOSITIONS CONTAINING COUPLED COPOLYMERS

(75) Inventors: Bernard Haveaux, Petit-Roeulx-lez-Nivelles; Emmanuel Lanza, Waterloo; Jean-Philippe Hallet, Woluwe-St-Pierre; André Noiret, Gembloux, all of (BE)

(73) Assignee: Fina Research, S.A., Feluy (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/341,321

(22) PCT Filed: Jan. 8, 1998

(86) PCT No.: PCT/EP98/00071

§ 371 Date: Sep. 13, 1999

§ 102(e) Date: Sep. 13, 1999

(87) PCT Pub. No.: WO98/30634

PCT Pub. Date: Jul. 16, 1998

(30) Foreign Application Priority Data

Jan. 8, 1997 (EP) .................................................. 97100184

(51) Int. Cl.⁷ .............................. C08L 95/00; C08L 53/02
(52) U.S. Cl. .............................. 524/68; 524/59; 524/575; 525/314
(58) Field of Search ................................ 524/68; 525/314

(56) References Cited

U.S. PATENT DOCUMENTS

| H876 | * | 1/1991 | Gilmore et al. | 524/68 |
| 4,196,115 | * | 4/1980 | Bresson | 524/68 |
| 4,391,949 | * | 7/1983 | St. Clair | 525/99 |
| 4,530,652 | * | 7/1985 | Buck et al. | 442/86 |
| 4,585,816 | * | 4/1986 | Vitkuske et al. | 524/68 |
| 5,296,547 | | 3/1994 | Nestegard et al. | 525/314 |
| 5,686,535 | * | 11/1997 | Erickson et al. | 525/314 |
| 5,691,420 | * | 11/1997 | Leffelaar et al. | 525/314 |
| 6,008,277 | * | 12/1999 | Haveaux et al. | 524/68 |

FOREIGN PATENT DOCUMENTS

| 0009209 | 9/1979 | (EP) . |
| 0317025 | 11/1988 | (EP) . |

* cited by examiner

*Primary Examiner*—Peter Szekely
(74) *Attorney, Agent, or Firm*—Jim D. Wheelington

(57) ABSTRACT

The present invention relates to bituminous compositions used for roofing and waterproofing membranes or material comprising asymmetrical coupled polyvinyl aromatic-polydiene block copolymers having improved physical properties over broader ranges of service temperatures than those obtained from bituminous compositions prepared with symmetrical block copolymers of similar type. The asymmetry of the copolymer which is characterised by polyvinyl aromatic endblocks of at least two different molecular weights, one high and one low, ensures improved physical performance to roofing and waterproofing membranes made from such compositions.

10 Claims, No Drawings

BITUMINOUS COMPOSITIONS CONTAINING COUPLED COPOLYMERS

FIELD OF THE INVENTION

The present invention relates to polymer-modified bituminous compositions, used for roofing and waterproofing membranes or material.

BACKGROUND OF THE INVENTION

Physical properties of a bituminous composition used for roofing and waterproofing membranes or material such as low temperature break resistance, flexibility, high temperature flow resistance and vicinity can be improved, as disclosed in U.S. Pat. No. 4,530,652, by incorporating radial elastomeric block copolymers whose structure is defined by the general formula $(A-B)_nY$ wherein Y is the residue of a polyfunctional coupling agent, (A-B) represents a single arm constituted of a polydiene block B and a polyvinyl aromatic endblock A, and "n" represents the number of arms (A-B).

Bituminous compositions comprising such copolymers, when used for roofing or waterproofing membranes, provide indeed good performance properties. However, the latter are obtained at the detriment of other physical properties ling their broader applications. For example, when those elastomeric block copolymers are added to a bituminous material to improve high temperature properties, the low temperature performance is impaired. Likewise, when both high and low temperature properties are met, the viscosity of the roofing material is such as to render its handling inoperable with standard equipment In U.S. Pat. No. 4,196,115, two radial elastomeric block copolymers, one having a low, the other having a high molecular weight, (or, alternatively, one radial of high molecular weight and one linear elastomeric block copolymer of low molecular weight) are blended together with a bituminous component to prepare a roofing material. Both copolymers are selected in such a way that the final bituminous composition yields the desirable high and low temperature properties satisfying tests which determine the said properties for ultimate use of the roofing membranes.

Unfortunately, this process implies the mixture of at least two compounds, namely two separately-prepared copolymers, with a bituminous component in order to obtain compositions that give the desired properties to the final membranes.

The present invention aims at new bituminous compositions which enable to enlarge the range of service temperatures of roofing and waterproofing membranes or material, without impairing appropriate viscosities that allow an easy handling with standard installation equipment, by proposing bituminous compositions that do not require the presence of two or more separately-prepared (co)polymers in bituminous compositions in order to be especially suitable to those applications.

An objective of this invention is to provide improved bituminous compositions which are suitable for roofing and waterproofing material or membranes.

A further objective of this invention is to disclose a bituminous composition which does not require the presence of more than one copolymer component.

A further objective of this invention is to enlarge the range of the working temperatures for roofing and waterproofing membranes or material which are made from these bituminous compositions.

A further objective of this invention is to ensure appropriate dynamic viscosities to the bituminous composition such that an easy handling of the ultimate roofing and waterproofing material or membranes be possible with standard installation equipments.

SUMMARY OF THE INVENTION

The present invention relates to bituminous compositions, used for roofing and waterproofing membranes or material, which consist of a bituminous component and one or more rubbery components constituted of coupled polyvinyl aromatic polydiene block copolymers having an asymmetrical structure, the term "asymmetrical" meaning that the endblocks in the molecular stature are polyvinyl aromatic segments of at least two different lengths, one short and one long.

More particularly, the bituminous composition of this invention is constituted of a bituminous component and elastomeric block copolymers whose molecular structures are described by the general formula $(A_1-X_1)_nY$ in which Y represents the residue of a coupling agent, "n" is the functionality number of said coupling agent and the number of arms $(A_1-X_1)$, $A_1$ represents polymeric endblocks of monovinyl aromatic monomers, and $X_1$ elastomeric segments. These asymmetrical elastomeric block copolymers are characterised by endblocks $A_i$ having at least two different molecular weights, one "high" and one "low".

It has been unexpectedly found that improved physical properties at both high and low temperature of a bituminous composition are obtained by incorporating small amounts of such asymmetrical elastomeric block copolymers in a bituminous composition. The copolymer-containing bituminous composition obtained by this invention is surprisingly provided with all the desired physical performance that gives to final roofing and waterproofing membranes or material, broader ranges of working temperatures and appropriate dynamic viscosities required by standard application equipments. The improved ranges of service temperatures, which are defined as the difference between the softening point and the cold-bending temperature, give to the ultimate membranes both good high and low temperature performance so that they can be used under prevailing environmental conditions in any geographical location.

DETAILED DESCRIPTION OF THE INVENTION

In the following description, the peak molecular weights $M_p$ of copolymers or polymeric segments are peak molecular weights that appear on the molecular weight distribution curve generated by Gel Permeation Chromatography analyses that are performed on those copolymers or segments.

The bituminous compositions of the invention essentially consist of (I) a bituminous component having a penetration grade according to ASTM D5-75 ranging from 3 to 30 mm at 25° C., and (II) at least one block copolymer constituted of polymerised monomer units of (a) at least one monovinyl aromatic hydrocarbon and (b) at least one conjugated diene, the said block copolymer comprising from 50 to 82% by weight of polymerised monomer (b), having a peak molecular weight ranging from 75000 to 350000, and having the general formula $(A_i—X_i)_nY$ in which Y represents the residue of a coupling agent, "n", greater than one, is the functionality number of said coupling agent and the number of arms $(A_i—X_i)$ wherein "i" is an integer ranging from 1 to "n", $A_i$ represents polymeric endblocks of monovinyl aromatic monomers (a), and $X_i$ elastomeric segments essentially constituted of polymerised conjugated diene monomers (b), the total amount of copolymer (II) in the bituminous component (I) ranging from 1 to 20% by weight of the total (I)+(II), the bituminous compositions being characterised in that the said copolymer contains blocks $A_i$ having at least two different peak molecular weights, at least one being comprised between 15000 and 60000 and at least one being comprised between 5000 and 25000, the ratio (c) of the highest to the lowest peak molecular weight being equal to or greater than 1.2, and the number (d) of blocks $A_i$ having a molecular weight above the number average molecular weight of blocks $A_i$ and that (e) of blocks $A_i$ having a molecular weight below said average each represent at least 5% of the total number of polymeric endblocks $A_i$.

Structural Definition of the Copolymers

The compositions of this invention essentially contain a bituminous component and asymmetrical coupled elastomeric block copolymers whose structure is described by the general formula $(A_i—X_i)_nY$ in which Y represents the residue of a coupling agent, "n" is the functionality number of this coupling agent and the number of arms $(A_i—X_i)$ wherein "i" is an integer ranging from 1 to "n", $A_i$ represents polymeric blocks of monovinyl aromatic monomers, and $X_i$ elastomeric segments essentially constituted of polymerised conjugated diene monomers.

The term "asymmetrical" means that the endblocks $A_i$, in the molecular structure described hereabove, have at least two peak molecular weights, one high and one low. The asymmetry ratio of such a copolymer is defined as the ratio of the highest to the lowest peak molecular weight of the endblocks $A_i$. When this ratio is equal to or greater than 1.2, the copolymer is said "asymmetrical"; when this ratio is lower than 1.2, the copolymer is said "symmetrical". In the scope of this invention, the asymmetry ratio of an asymmetrical copolymer is equal to or greater than 1.2 and preferably greater than 1.4. The peak molecular weight of the elastomeric segments $X_i$ may be the same for each arm, or may have various values for two or more arms, and the number of arms, depending on the functionality number of the coupling agent, is equal to or greater than 2, preferably ranging from 3 to 6 and most preferably equal to 4.

It has surprisingly been found that the asymmetry characteristic of copolymers of this invention was able to give to roofing and waterproofing membranes or material broader ranges of service temperatures, without impairing other necessary physical properties such as dynamic viscosities at high temperature.

Monomer Definitions

The monovinyl aromatic monomers which constitute the polymeric endblocks $A_i$ contain from 8 to 18 carbon atoms. Examples of such monomers include styrene (ethenylbenzene), alphamethylstyrene, vinylpyridine, ethylstyrene, t-butylstyrene, isopropylstyrene, dimethyistyrene, other alkylated styrenes, and the like; among them, the most preferred monomer used for this invention is the styrene.

The conjugated diene monomers which essentially constitute the elastomeric segments $X_i$ contain from 4 to 12 carbon atoms. Examples of such monomers include 1,3-butadiene, isoprene (2-methyl 1,3-butadiene), ethylbutadiene, phenylbutadiene, piperylene, dimethylbutadiene, hexadiene, ethylhexadiene, and the like; among them, 1,3-butadiene is generally preferred.

Specifications of Block Copolymers

The asymmetrical elastomeric block copolymers used in the present invention and represented by the general formula $(A_i—X_i)_nY$ can be prepared by anionic polymerisation such as described in U.S. Pat. No. 5,296,547 that can be adapted to the needs of the present invention.

The molecular weight distribution of such copolymers is characterised by a peak molecular weight after coupling ranging from 75000 to 350000.

Such copolymers comprise from 18 to 50% and preferably 27 to 35% by weight of polymerised monovinyl aromatic monomers and from 50 to 82% and preferably 65 to 73% by weight of polymerised conjugated diene monomers.

The elastomeric segments $X_i$ of each arm contain essentially polymerised conjugated diene monomers, and have preferably a peak molecular weight ranging from 10000 to 80000.

As already described in the structural definition of the copolymers of this invention, the polymeric endblocks $A_i$ of monovinyl aromatic monomers have at least two different peak molecular weights whose highest and lowest values define the asymmetry ratio. For such endblocks, at least one peak molecular weight ranges from 15000 to 60000 and at least one from 5000 to 25000. The molecular weight of an endblock $A_i$ is said "high" if this value is at least equal to the number average molecular weight of all the blocks $A_i$ and is said "low" if this value is lower than this average. The number of blocks $A_i$ of "high" molecular weight and the number of blocks $A_i$ of "low" molecular weight each represent at least 5% of the total number of polymeric endblocks $A_i$ and preferably at least 25%. In the coupled copolymer molecular structure described by the formula $(A_i—X_i)_nY$, an arm is said "long" when comprising an endblock $A_i$ of "high" molecular weight and is said "short" when comprising an endblock of "low" molecular weight. The number of "long" and "short" arms of individual molecules can be averaged over all the copolymer molecules giving respectively the average numbers of "long" and "short" arms "$a_1$" and "$a_2$" whose sum is equal to "n".

Copolymer Concentration in the Bituminous Composition

The copolymer weight concentration in the bituminous composition of this invention ranges from 1 to 20% and preferably from 8 to 15%.

The compositions of this invention appear under the form of copolymer-bituminous component mixtures having two phases, namely the rubber phase which mainly contains the block copolymers and the bituminous phase which mainly contains the bituminous component. Preferably, the copolymer concentration will be sufficiently high as to have the rubber phase as the continuous phase and the bituminous phase as the dispersed phase. It has been observed that said sufficiently high concentration is generally 8%.

It is easy for an average skilled in the art to observe when the rubber phase becomes the continuous phase while preparing a composition of this invention: when he mixes, in a hot liquid bituminous component, a suitable amount of block copolymers to prepare the composition, the rubber phase is at first the dispersed phase. After stirring, when the rubber phase becomes the continuous phase, the dynamic viscosity of the hot liquid mixture jumps by about 50% or more to a new plateau value.

Bituminous Component

Bituminous components used to prepare bituminous compositions of this invention are derived petroleum products characterised by having penetration grades ranging from 30 to 300 tenths of millimeter at 25° C., as measured by the ASTM standard procedure D5-75. Those components can be oxidized or non oxidized bitumen. Non oxidized bitumen are generally preferred.

Block Copolymer Examples

Table 1.1 describes examples of possible asymmetrical block copolymers, that are suitable to this invention, with their structural characteristics. The polyvinyl aromatic end-blocks $A_i$ have only two peak molecular weights, the highest one $(A_1, M_p)$ and the lowest one $(A_2, M_p)$ that are used to compute the asymmetry ratio. "$a_1$" and "$a_2$" are the average numbers of "long" and "short" arms containing the end-blocks $A_i$ and $A_2$ of "high" and "low" molecular weight and "n", equal to the sum of "$a_1$" and "$a_2$", is the number of arms.

For example, various additives as antioxidants, fire retardants, or fillers as carbonates, silicates, mineral aggregates, fibers may be advantageously included in the bituminous composition of this invention to prepare roofing and waterproofing membranes or material.

TABLE 1.2

ROOFING OR WATERPROOFING MEMBRANES
fillers and additives in the compositions

| Coupounds | Weig. parts per 100 parts of bituminous composition |
|---|---|
| silicates | 25–85 |
| antioxidants | 0.0–0.5 |
| fibers | 0.0–2.0 |

In table 1.2, possibilities of general formulation show typical concentration ranges for additives and fillers that can be included in a bituminous composition of the present invention to prepare roofing and waterproofing membranes or material.

Example of Mixing and Blending Procedure

Standard equipment to blend copolymers with a bituminous component can be used to prepare the bituminous composition. The proper section of the mixer is known to the average skilled in the art and needs thus not to be discussed.

Standard mixing procedures, well known by those average skilled in the art, may advantageously be used here. The method described herebelow given as an example is not limitative; a high shear mixer can be an appropriate equipment for this invention to blend the copolymer with the bituminous component.

A bituminous component is charged in a beaker and heated to about 180° C. A slow stirring ensures a constant temperature throughout the material. Pellets, flakes, crumbs, powder or other forms of the elastomeric block copolymers are introduced at room temperature in the hot bituminous COPOLYMER DESCRIPTION
in invention Specifications

| | | Elastomeric Segments | | | | Endblocks | | | | | |
| | asym. | | monom | average | W | monom | $A_1$ | $A_2$ | arms. | aver.nb | |
| Name | ratio | Mp | type | Mp | % | type | Mp | Mp | n | $a_1$ | $a_2$ | Comments |
|---|---|---|---|---|---|---|---|---|---|---|---|---|
| BR-1 | 3.86 | 179000 | butadiene | 29000 | 65.7 | styrene | 328000 | 8500 | 4 | 1.13 | 2.87 | asym.structure of 4 arms |
| BR-2 | 2.45 | 285000 | butadiene | 50000 | 70.3 | styrene | 319000 | 13000 | 4 | 1.73 | 2.27 | asym.structure of 4 arms |
| IR-3 | 4.22 | 172000 | isoprene | 60000 | 69.4 | styrene | 426000 | 10100 | 2 | 1.00 | 1.00 | asym.structure of 2 arms |
| BR-4 | 3.35 | 326000 | butadiene | 38000 | 70.0 | styrene | 218000 | 6500 | 6 | 3.85 | 2.15 | asym.structure of 6 arms |
| BR-5 | 4.04 | 219000 | butadiene | 36000 | 65.9 | styrene | 412000 | 10200 | 4 | 1.09 | 2.91 | asym.structure of 4 arms |
| BR-8 | 2.82 | 245000 | butadiene | 53000 | 65.0 | styrene | 480000 | 17000 | 3 | 1.12 | 1.88 | asym.structure of 3 arms |

Mp: measured peak molecular weight
W: Weight percent of elastomeric segmentsin copolymer

Fillers and Additives

It is obvious to those skilled in the art that additives other than those considered as a part of this invention can be included in the present compositions or in components thereof while or before preparing the present compositions to accomplish special functions or to enhance the contribution to required properties.

component. The composition is shear mixed at a rotation speed adjusted to keep the bitumen temperature between 180 and 200° C. until a homogeneous mixture is obtained. The variations of the mixture viscosity are recorded by the agitator torque. When the viscosity jumps of about 50% or more to a new plateau value, the rubber phase is the continuous phase.

At this time, the following tests are achieved to evaluate the physical performance of the bituminous composition:
  Ring and Ball temperature (R&B, ASTM D36-76) giving the softening point.
  Cold-Bending temperature (C-B, DIN 52123); the sheet samples of three millimeters thick are bent on a 30 mm mandrel.
  Dynamic Viscosity at 160 and 180° C. (Dyn.Visc., test described herebelow).
The working temperature ranges are computed as the difference between the Ring and Ball and the Cold-Bending temperatures.
The Dynamic Viscosity is determined by a "Cone-Plate" rotary viscosimeter system of type "HAAKE". The selected cone for this application is labeled "PK1—1°", 1° meaning that the cone has an aperture angle of [180°—(2×1°)] or 178°. When the viscosimeter reaches the operating temperature of 160 or 180° C., about 0.5 g of hot copolymer-bituminous component mixture is laid down on the hot plate. The hot cone is pressed down to the plate which is covered by the hot copolymer-bituminous component paste. When the operating temperature is reached throughout the system, the cone starts to rotate up to a shear rate of 100 sec$^{-1}$ in 200 seconds. At a constant shear rate of 100 sec$^{-1}$, 50 shear stress coneplate values are monitored over two minutes, averaged and converted into dynamic viscosities with an appropriate conversion factor.

A good operability of a bituminous composition means that the dynamic viscosity ranges from about 1.0 to about 2.5 Pa.s at 180° C. and m about 2 to about 4 Pa.s at 160° C.

DESCRIPTION OF EXAMPLES

Examples of elastomeric block copolymers which are in the invention specifications are described on table 1.1. The copolymers are blended with a bituminous component at 180° C., to obtain a homogenous mixture of copolymer and bituminous component. After a period varying from 40 to 120 minutes of stirring depending on the copolymer concentration, the rubber phase becomes the continuous phase. At his time, appropriate samples are taken to measure the Ring and Ball temperature, the Cold-Bending temperature and the dynamic viscosities according to the standard procedures described above.

For the understanding of the examples and comparative examples, an asymmetrical block copolymer of this invention is said comparable to a symmetrical block copolymer when the essential difference between them resides in the asymmetry ratio, all the remaining factors being comparable.

Table 1.3 summarises examples of out of invention specifications copolymers that are used for comparative examples. An example of comparable asymmetrical and symmetrical copolymers is copolymer BR-2 on table 1.1 and BR-b on table 1.3.

TABLE 1.3

COPOLYMER DESCRIPTION
Out of invention Specifications

| | | Elastomeric Segments | | | | Endblocks | | | aver.nb | | |
|---|---|---|---|---|---|---|---|---|---|---|---|
| Name | asym. ratio | Mp | monom type | average Mp | W % | monom type | A$_1$ Mp | A$_2$ Mp | arms. n | a$_1$ | a$_2$ | Comments |
| BR-a | 1.13 | 453000 | butadiene | 96000 | 85.0 | styrene | 18000 | 16000 | 4 | 2.00 | 2.00 | asymmetric structure out of spec. |
| BR-b | 1.00 | 271000 | butadiene | 48000 | 70.5 | styrene | 20000 | 20000 | 4 | — | — | similar to BR-2, but sym.structure |
| BR-d | 1.00 | 255000 | butadiene | 51000 | 80.4 | styrene | 12500 | 12500 | 4 | — | — | sym.structure of 4 arms |
| BR-e | 1.00 | 341000 | butadiene | 57000 | 66.6 | styrene | 28500 | 28500 | 4 | — | — | sym.structure of 4 arms |

Mp: measured peak molecular weight
W: Weight percent of polymerised diene monomers in copolymer All the bituminous compositions are prepared by blending copolymers of tables 1.1 or 1.3 with bituminous components of various penetration grades. No fillers nor additives have been included to these compositions.

The description of the copolymers components and bituminous components, and the physical performance obtained from the bituminous compositions made from are tabulated and commented for each example.

Example 1

This example illustrates typical physical properties that can be obtained from a B80/100 bituminous component blended with asymmetrical block copolymer BR-1 constituted of polystyrene and polybutadiene segments. Copolymer and bituminous component data are outlined together with the bituminous composition properties herebelow on table 2.1.

TABLE 2.1

| | COPOLYMER DATA | | | | | | | | | | | |
|---|---|---|---|---|---|---|---|---|---|---|---|---|
| | | Elast. Segments | | | | Endblocks | | | | | | weig. |
| | asym | | mon | aver. | W | mon | $A_1$ | $A_2$ | n | aver.nb | | conc |
| Name | ratio | Mp | type | Mp | % | type | Mp | Mp | — | $a_1$ | $a_2$ | % |
| BR-1 | 3.86 | 179000 | butad | 29000 | 65.7 | styr. | 32800 | 8500 | 4 | 1.13 | 2.87 | 13 |
| Comparative example: | | | | | | | | | | | | |
| BR-a | 1.13 | 453000 | butad | 96000 | 85.0 | styr. | 18000 | 16000 | 4 | 2.00 | 2.00 | 13 |

| | BIT.COMPON | | | | BIT.COMPOS.RESULTS | | |
|---|---|---|---|---|---|---|---|
| | | Pen @ 25° C. | R & B | C-B | w.T* range | dyn.viscosity | |
| | | | | | | 160° C. | 180° C. |
| | Name | dmm(10⁻⁴ m) | ° C. | ° C. | ° C. | Pa · s | Pa · s |
| | BR-1 | 80/100 | 141 | −46 | 187 | 3.1 | 2.0 |
| | Comparative example: | | | | | | |
| | BR-a | 80/100 | 95 | −35 | 130 | 8.2 | 4.0 |

Mp: measured peak molecular weight
W: Weight percent of elastomeric segments in copolymer For a copolymer weight concentration of 13%, Ring and Ball temperature of 141° C. and Cold-Bending temperature of −46° C. of the composition enlarge the range of working temperature to 187° C. The dynamic viscosities of 3.1 Pa.s at 160° C. and 2.0 Pa.s at 180° C. are in the adequate ranges of 2.0 to 4.0 Pa.s at 160° C. and 1.0 to 2.5 Pa.s at 180° C. to ensure an easy handling of the ultimate membrane or material with standard installation equipments.

The comparative example shows physical properties of a bituminous composition obtained by blending, with the same bituminous component, a comparable symmetrical radial block copolymer BR-a of 4 arms which is out of the invention specifications: the asymmetry ratio of 1.13 is lower than the specified limit of 12, the polymerised diene monomer weight content of 85% is over the upper limit of 82% and the peak molecular weight of the copolymer of 450000 is widely over the specied upper limit of 350000. We observe that the range of working temperature is only 130° C. and that the dynamic viscosity at 160° C. is 8.2 Pa.s and that at 18° C. 4.0 Pas. The performance of working temperature for this composition appears to be not very favourable and the viscosity values are out the specified ranges that ensure an easy handling of the ultimate membranes or material with standard installation equipments.

Example 2

Example 2 show results in a bituminous composition constituted of copolymer BR-2 and a B180/200 bituminous component as illustrated on table 2.2. BR-2 copolymer, whose weight concentration is 13%, has a peak molecular weight of 285000, a radial structure of 4 arms for which an average of 1.73 arms corresponds to long polystyrene endblocks and an average of 2.27 to short ones, and endblock peak molecular weights of 31900 and 13000 respectively corresponding to an asymmetry ratio of 2.45. We observe that the range of working temperature is enlarged to 170° C. while the dynamic viscosity remains in the adequate ranges of 2 to 4 Pa.s at 160° C. and 1.0 to 2.5 Pa.s at 180° C.

TABLE 2.2

| | COPOLYMER DATA | | | | | | | | | | | |
|---|---|---|---|---|---|---|---|---|---|---|---|---|
| | | Elast. Segments | | | | Endblocks | | | | | | weig. |
| | asym | | mon | aver. | W | mon | $A_1$ | $A_2$ | n | aver.nb | | conc |
| Name | ratio | Mp | type | Mp | % | type | Mp | Mp | — | $a_1$ | $a_2$ | % |
| BR-2 | 2.45 | 285000 | butad | 50000 | 70.3 | styr. | 31900 | 13000 | 4 | 1.73 | 2.27 | 13 |
| Comparative example: | | | | | | | | | | | | |
| BR-b | 1.00 | 271000 | butad | 48000 | 70.5 | styr. | 20000 | 20000 | 4 | — | — | 13 |

| | BIT.COMPON | | | | BIT.COMPOS.RESULTS | | |
|---|---|---|---|---|---|---|---|
| | | Pen @ 25° C. | R & B | C-B | w.T* range | dyn.viscosity | |
| | | | | | | 160° C. | 180° C. |
| | Name | dmm(10⁻⁴ m) | ° C. | ° C. | ° C. | Pa · s | Pa · s |
| | BR-2 | 180/200 | 123 | −47 | 170 | 2.9 | 1.6 |
| | Comparative example: | | | | | | |
| | BR-b | 180/200 | 115 | −38 | 153 | 3.3 | 1.9 |

TABLE 2.2-continued

Mp: measured peak molecular weight
W: Weight percent of elastomeric segments in copolymer A comparative example illustrates the same bituminous composition as that of latter example except that symmetrical copolymer BR-b replaces copolymer BR-2. Copolymer BR-b, out of invention specifications, is comparable to copolymer BR-2 as illustrated on table 2.2: BR-b has a symmetrical structure of 4 arms, a peak molecular weight of 271000 and an endblock peak molecular weight of 20000. We observe that the range of working temperature is 153° C. corresponding to 17° C. lower than the working temperature range of example 2. Therefore, the comparison of example 2 with this comparative example shows that a broader range of working temperature is obtained for bituminous compositions in which asymmetrical block copolymers are present.

Example 3

In example 3 and the comparative example, a bituminous compositions is prepared with the same components as those of example 2 and its comparative example as illustrated on table 2.3. namely copolymers BR-2, BR-b and bituminous component B180/200. The only difference between the compositions of example 3 and those of example 2 is the copolymer weight concentration which is only 8% instead of 13%. In fact, 8% was the minimum necessary copolymer weight concentration to make from the rubber phase the continuous phase after stirring the bituminous mixture forty minutes at 180° C.

Looking at table 2.3. we conclude hat a broader range of working temperature can also be obtained for bituminous compositions of various copolymer concentrations in which asymmetrical block copolymers are present the range of working temperature is 122° C. for the bituminous composition of example 3 containing asymmetrical copolymer BR-2 and only 104° C. for the bituminous composition of the comparative example containing comparable symmetrical copolymer BR-b.

Example 4

Example 4 illustrates typical physical properties that can be obtained from a B80/100 bituminous component blended with asymmetrical block copolymer IR-3 constituted of polystyrene and polyisoprene segments. Copolymer and bituminous component data are outlined on table 2.4 together with the bituminous composition results.

TABLE 2.3

| | COPOLYMER DATA | | | | | | | | | |
|---|---|---|---|---|---|---|---|---|---|---|
| | asym | | Elast. Segments | | | | Endblocks | | | weig. |
| | | | mon | aver. | W | mon | $A_1$ | $A_2$ | n | aver.nb | conc |
| Name | ratio | Mp | type | Mp | % | type | Mp | Mp | — | $a_1$ $a_2$ | % |
| BR-2 | 2.45 | 285000 | butad | 50000 | 70.3 | styr. | 31900 | 13000 | 4 | 1.73   2.27 | 8 |
| Comparative example: | | | | | | | | | | | |
| BR-b | 1.00 | 271000 | butad | 48000 | 70.5 | styr. | 20000 | 20000 | 4 | —   — | 8 |

| | BIT.COMPON | | | | | BIT.COMPOS.RESULTS | |
|---|---|---|---|---|---|---|---|
| | | | | | | w.T* | dyn.viscosity |
| | Name | Pen @ 25° C. dmm($10^{-4}$ m) | R & B ° C. | C-B ° C. | range ° C. | 160° C. Pa · s | 180° C. Pa · s |
| | BR-2   180/200 | 104 | −16 | 122 | 2.1 | 1.2 | |
| | Comparative example: | | | | | | |
| | BR-b   180/200 | 96 | −6 | 104 | 2.3 | 1.1 | |

Mp: measured peak molecular weight
W: Weight percent of elastomeric segments in copolymer

TABLE 2.4

| | | | | | | | | | | | |
|---|---|---|---|---|---|---|---|---|---|---|---|
| | COPOLYMER DATA ||||||||||||
| | | Elast. Segments ||| | Endblocks ||| | | weig. |
| | asym | | mon | aver. | W | mon | $A_1$ | $A_2$ | n | aver.nb | conc |
| Name | ratio | Mp | type | Mp | % | type | Mp | Mp | — | $a_1$  $a_2$ | % |
| IR-3 | 4.22 | 172000 | isopr | 60000 | 69.4 | styr. | 42600 | 10100 | 2 | 1.00  1.00 | 13 |

| | | | | | | |
|---|---|---|---|---|---|---|
| | | | BIT.COMPOS.RESULTS ||||
| | BIT.COMPON || | | w.T* | dyn.viscosity |
| | | Pen @ 25° C. | R & B | C-B | range | 160° C.  180° C. |
| | Name | dmm($10^{-4}$ m) | ° C. | ° C. | ° C. | Pa · s  Pa · s |
| | IR-3 | 80/100 | 111 | −48 | <u>159</u> | <u>2.2</u>  <u>1.5</u> |

Mp: measured peak molecular weight
W: Weight percent of elastomeric segments in copolymer For a copolymer weight concentration of 13%, Ring and Ball temperature of 111° C. and Cold-Bending temperatures of −48° C. measured on the composition enlarge the range of working temperature to 159° C. The dynamic viscosities of 2.2 Pa.s at 160° C and 1.5 Pa.s at 180° C. still remain in adequate ranges of easy handling of final membranes or material for installation with standard equipments.

Example 5

As illustrated on table 2.5, a bituminous composition is prepared by blending a B180/200 bituminous component with radial asymmetrical copolymer BR4 of 8 arms for which an average of 3.85 arms corresponds to long polystyrene endblocks and an average of 2.15 to short ones. The endblock peak molecular weights of 21800 and 6500 respectively correspond to an asymmetry ratio of 3.35. The peak molecular weight of BR-4 is 326000 and the weight concentration in the composition is 13%.

The Ring and Ball temperature of 142° C. and the Cold-Bending temperature of −39° C. result in an enlarged range of working temperature of 181° C. while the dynamic viscosities of 3.2 Pa.s at 160° C. and 2.0 Pa.s at 180° C. still remain in an adequate range of easy operability.

Example 6

Table 2.6 illustrates a bituminous composition constituted of a B180/200 bituminous component with asymmetrical copolymer BR-5 of 4 arms for which an average of 1.09 arms corresponds to long polystyrene endblock and an average of 2.91 to short ones. The endblock peak molecular weights of 41200 and 10200 respectively correspond to an asymmetry ratio of 4.04. The peak molecular weight of BR-5 is 219000 and the weight concentration in t composition is 13%.

TABLE 2.6

| | | | | | | | | | | | |
|---|---|---|---|---|---|---|---|---|---|---|---|
| | COPOLYMER DATA ||||||||||||
| | | Elast. Segments ||| | Endblocks ||| | | weig. |
| | asym | | mon | aver. | W | mon | $A_1$ | $A_2$ | n | aver.nb | conc |
| Name | ratio | Mp | type | Mp | % | type | Mp | Mp | — | $a_1$  $a_2$ | % |
| BR-4 | 3.35 | 326000 | butad | 38000 | 70.0 | styr. | 21800 | 6500 | 6 | 3.85  2.15 | 13 |

| | | | | | | |
|---|---|---|---|---|---|---|
| | | | BIT.COMPOS.RESULTS ||||
| | BIT.COMPON || | | w.T* | dyn.viscosity |
| | | Pen @ 25° C. | R & B | C-B | range | 160° C.  180° C. |
| | Name | dmm($10^{-4}$ m) | ° C. | ° C. | ° C. | Pa · s  Pa · s |
| | BR-4 | 180/200 | 142 | −39 | <u>181</u> | <u>3.2</u>  <u>2.0</u> |

Mp: measured peak molecular weight
W: Weight percent of elastomeric segments in copolymer

TABLE 2.6

| | | | | | | | | | | | |
|---|---|---|---|---|---|---|---|---|---|---|---|
| | | | | | COPOLYMER DATA | | | | | | |
| | | | Elast. Segments | | | | Endblocks | | | | weig. |
| | asym | | mon | aver. | W | mon | $A_1$ | $A_2$ | n | aver.nb | conc |
| Name | ratio | Mp | type | Mp | % | type | Mp | Mp | — | $a_1$   $a_2$ | % |
| BR-5 | 4.04 | 219000 | butad | 36000 | 65.9 | styr. | 41200 | 10200 | 4 | 1.09   2.91 | 13 |

| | | | | | | |
|---|---|---|---|---|---|---|
| | | | | | BIT.COMPOS.RESULTS | |
| | BIT.COMPON | | | w.T* | dyn.viscosity | |
| Name | Pen @ 25° C. dmm($10^{-4}$ m) | R & B ° C. | C-B ° C. | range ° C. | 160° C. Pa · s | 180° C. Pa · s |
| BR-5 | 180/200 | 132 | −44 | 176 | 2.2 | 1.5 |

Mp: measured peak molecular weight
W: Weight percent of elastomeric segments in copolymer The Ring and Ball temperature of 132° C. and the Cold-Bending temperature of −44° C. result in an enlarged range of working temperature of 176° C. while the dynamic viscosities of 2.2 Pa.s at 160° C. and 1.5 Pa.s at 180° C. still remain in an adequate range of easy operability.

Example 7

As illustrated on table 2.7, a bituminous composition is prepared by blending a 250 bituminous component wit asymmetrical copolymer BR-8 of 3 arms for which an average of 1.12 arms corresponds to long polystyrene endblocks and an average of 1.88 to short ones. The endblock peak molecular weights of 48000 and 17000 respectively correspond to an asymmetry ratio of 2.82. The peak molecular weight of BR-8 is 245000 and the weight concentration of BR-8 in the composition is 13%.

TABLE 2.7

| | | | | | | | | | | | |
|---|---|---|---|---|---|---|---|---|---|---|---|
| | | | | | COPOLYMER DATA | | | | | | |
| | | | Elast. Segments | | | | Endblocks | | | | weig. |
| | asym | | mon | aver. | W | mon | $A_1$ | $A_2$ | n | aver.nb | conc |
| Name | ratio | Mp | type | Mp | % | type | Mp | Mp | — | $a_1$   $a_2$ | % |
| BR-8 | 2.82 | 245000 | butad | 53000 | 85.0 | styr. | 48000 | 17000 | 3 | 1.12   1.88 | 13 |

| | | | | | | |
|---|---|---|---|---|---|---|
| | | | | | BIT.COMPOS.RESULTS | |
| | BIT.COMPON | | | w.T* | dyn.viscosity | |
| Name | Pen @ 25° C. dmm($10^{-4}$ m) | R & B ° C. | C-B ° C. | range ° C. | 160° C. Pa · s | 180° C. Pa · s |
| BR-8 | 250 | 140 | −39 | 179 | 2.6 | 1.1 |

Mp: measured peak molecular weight
W: Weight percent of elastomeric segments in copolymer The Ring and Ball temperature of 140° C. and the Cold-Bending temperature of −39° C. result in an enlarged range of working temperature of 179° C. while the dynamic viscosities of 2.6 Pa.s at 160° C. and 1.1 Pa.s at 180° C. still remain in an adequate range of easy operability.

For examples 1 to 7 outlined hereabove, the physical properties that are obtained from the bituminous compositions of this invention are summarised on table 3.

TABLE 3

Examples of the Invention
COPOLYMER-BITUMINOUS COMPONENT MIXTURES
Composition of the Invention
Physical Properties

| | Copolymer | | | Bituminous Composition Properties | | | | |
|---|---|---|---|---|---|---|---|---|
| Exa- | | Weight | Bit.Compon. | | | Range of | Dyn. Viscosity | |
| mple Nb | Name | in mixt. % | Pen @ 25° C. dmm($10^{-4}$ m) | R & B ° C. | C-B ° C. | serv. T° ° C. | @ 160° C. Pa · s | @ 180° C. Pa · s |
| 1 | BR-1 | 13 | 80/100 | 141 | −46 | 187 | 3.1 | 2.0 |
| 2 | BR-2 | 13 | 180/200 | 123 | −47 | 170 | 2.9 | 1.6 |
| 3 | BR-2 | 8 | 180/200 | 104 | −18 | 122 | 2.1 | 1.2 |
| 4 | IR-3 | 13 | 80/100 | 111 | −48 | 159 | 2.2 | 1.5 |
| 5 | BR-4 | 13 | 180/200 | 142 | −39 | 181 | 3.2 | 2.0 |
| 6 | BR-5 | 13 | 180/200 | 132 | −44 | 176 | 2.2 | 1.5 |
| 9 | BR-8 | 13 | 250 | 140 | −39 | 179 | 2.6 | 1.1 |

R & B: Ring and Ball temperatue
C-B: Cold-Bending temperature

What is claimed is:

1. Bituminous compositions essentially consisting of
   (I) a bituminous component having a penetration grade according to ASTM D5-75 ranging from 3 to 30 mm at 25° C., and
   (II) at least one block copolymer constituted of polymerised monomer units of
      (a) at least one monovinyl aromatic hydrocarbon and
      (b) at least one conjugated diene,
   the said block copolymer comprising from 50 to 82% by weight of polymerised monomer (b), having a peak molecular weight ranging from 75000 to 350000, and having the general formula $(A_i—X_i)_nY$ in which Y represents the residue of a coupling agent, "n", greater than one, is the functionality number of said coupling agent and the number of arms $(A_i—X_i)$ wherein "i" is an integer ranging from 1 to "n", $A_i$ represents polymeric endblocks of monovinyl aromatic monomers (a), and $X_i$ elastomeric segments essentially constituted of polymerised conjugated diene monomers (b),
   the total amount of copolymer (II) in the bituminous component (I) ranging from 1 to 20% by weight of the total (I)+(II),
   the bituminous compositions being characterised in that
      the said copolymer contains blocks $A_i$ having at least two different peak molecular weights, at least one being comprised between 15000 and 60000 and at least one being comprised between 5000 and 25000, the ratio (c) of the highest to the lowest peak molecular weight being equal to or greater than 1.2, and
      the number (d) of blocks $A_i$ having a molecular weight above the number average molecular weight of blocks $A_i$ and that (e) of blocks $A_i$ having a molecular weight below said average each represent at least 5% of the total number of polymeric endblocks $A_i$.

2. A bituminous composition according to claim 1 wherein each block copolymer contains elastomeric segments $X_i$ whose peak molecular weight ranges from 10000 to 80000.

3. A bituminous composition according to claims 1 or 2 wherein the copolymer comprises from 65 to 73% by weight of polymerised monomers b).

4. A bituminous composition according to claim 1 wherein the number of arms "n" ranges from 3 to 6.

5. A bituminous composition according to claim 1 wherein the monomer (a) is styrene and the conjugated diene monomer (b) is 1,3-butadiene or isoprene.

6. A bituminous composition according to claim 1 wherein the block copolymer weight concentration is limited, on the lower side, by the smallest copolymer amount which is necessary to have as continuous phase the rubber phase.

7. A bituminous composition according to claim 1 wherein the block copolymer weight concentration ranges from 8 to 15%.

8. A bituminous composition according to claim 1 wherein the ratio (c) is greater than 1.4.

9. A bituminous composition according to claim 1 wherein each of the numbers (d) and (e) of blocks $A_i$ represents at least 25% of the total number of polymeric endblocks $A_i$.

10. The bituminous composition of claim 5 wherein the ratio (c) of the highest to the lowest peak molecular weight is greater than 1.4.

* * * * *